No. 670,748. Patented Mar. 26, 1901.
P. WEDDELER.
FLEXIBLE SHAFTING.
(Application filed Oct. 25, 1900.)
(No Model.)
Fig. 3.
Fig. 4.
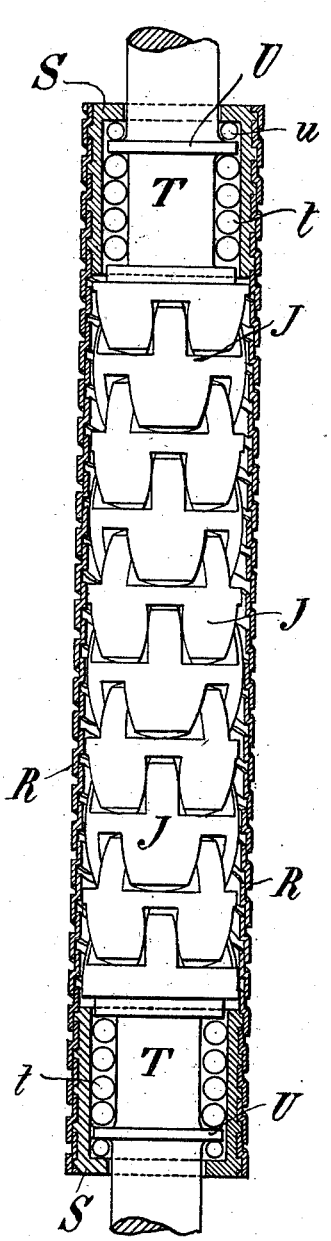
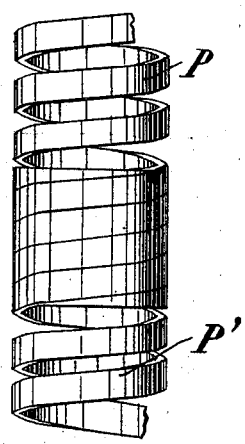
Fig. 1.
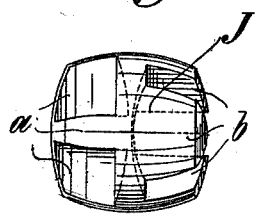
Fig. 5.
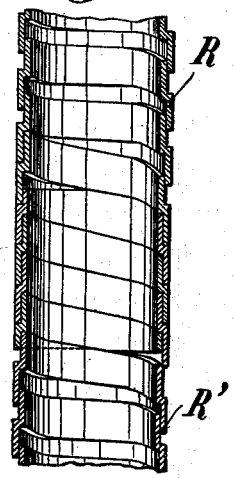
Fig. 2.
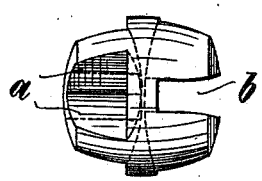
Witnesses.
Inventor.
Paul Weddeler.
By James L. Norris
Atty.

UNITED STATES PATENT OFFICE.

PAUL WEDDELER, OF BERLIN, GERMANY.

FLEXIBLE SHAFTING.

SPECIFICATION forming part of Letters Patent No. 670,748, dated March 26, 1901.

Application filed October 25, 1900. Serial No. 34,380. (No model.)

*To all whom it may concern:*

Be it known that I, PAUL WEDDELER, a subject of the Emperor of Germany, residing at No. 78 Bernauerstrasse, Berlin, in the German Empire, have invented Improvements in Flexible Shafting; and I do hereby declare the nature of this invention and in what manner the same is to be performed to be particularly described and ascertained in and by the following statement, reference being had to the accompanying drawings and the letters marked thereon.

This invention relates to the production of flexible shafting by means of spirally-wound metal bands surrounding a series of links adapted to engage one with the other without any pivotal connection, so as to form the desired length of shafting.

In the drawings, Figures 1 and 2 illustrate elevations of the element or link. Fig. 3 illustrates the flexible shafting constructed in accordance with my invention, and Figs. 4 and 5 illustrate the manner in which shafts of any desired length can be produced by screwing the spirals of the bands one into the other.

Referring to the drawings by reference-letters, J indicates the elements or links, which are each provided with recesses $a$ and projections $b$.

In constructing a shaft of the elements or links J, as illustrated in Fig. 3, the elements or links are arranged in a sheath R, formed of Z-shaped metal bands spirally wound, so that the spirals will project one onto the other. The sheath is provided at each end with a shaft or end piece T. The shafts T are arranged in suitable sockets with ball-bearings interposed between the same. A collar U and a set of balls $u$ serve to take longitudinal thrust. The elements or links interlock one with the other and are retained in position by means of the sheath, which is stretched over them in the manner shown in the drawings. The sheath is suitably secured to the end sockets S, and as the shafts T are free to rotate within the sockets S it follows that the sheath does not participate in the rotation of the shaft, so that it can be laid hold of without danger. This form of shaft possesses a further advantage for the reason that it can be made of any desired length by merely fitting together or screwing the spirals of the band one into the other.

Fig. 4 shows a sheath made of a flat band spirally wound. The shaft in Fig. 4 further shows the manner in which shafts of different length may be obtained—for example, by separating or contracting the spirals, or, in other words, by pulling apart the spirals or moving the same toward one another. Fig. 5 also shows the manner in which shafts of the desired length can be obtained. In Figs. 4 and 5 the spirals are indicated by P or P' or R or R', respectively.

Having thus fully described my invention, what I claim as new, and desire to secure by Letters Patent, is—

1. A flexible shafting consisting of a series of links, a sheath surrounding said links and formed of Z-shaped bands spirally wound, and a shaft connected to each end of the series of links for rotating the same independent of the sheath.

2. A flexible shaft consisting of a series of interlocking links, a sheath surrounding said links, a socket connected to each end of the said sheath, a shaft connected to each end of the series of links and adapted to rotate the same independently of the sheath, and a series of ball-bearings interposed between said shaft and socket.

3. A flexible shafting consisting of a series of links, a sheath surrounding said links and formed of Z-shaped bands spirally wound, a shaft connected to each end of the series of links and adapted to rotate the same independent of the sheath, and ball-bearings surrounding the said shaft.

4. A flexible shaft consisting of a series of interlocking links, a sheath surrounding said links and consisting of a Z-shaped band spirally wound, a socket connected to each end of the said sheath, a shaft arranged in said socket, connected to each end of the series of links and adapted to rotate the links independently of the sheath, and ball-bearings interposed between the sockets and the shafts.

5. A flexible shaft consisting of a series of links, a sheath surrounding the same and consisting of a band spirally wound so that the spirals project one into the other, and means for rotating the said links independently of the said sheath.

6. A flexible shafting consisting of a series of interlocking links, a sheath surrounding the same and consisting of a Z-shaped band spirally wound, a socket connected to each end of said sheath, a shaft mounted in each of said sockets and connected to the end of the series of links for rotating the same independently of the said sheath, and means for taking up the longitudinal thrust of said series of links.

7. A flexible shafting consisting of a series of links, a sheath surrounding the same and consisting of a Z-shaped band spirally wound, so that the spirals will project one into the other, and means for rotating the said links independently of the said sheath.

In witness whereof I have hereunto set my hand in presence of two witnesses.

PAUL WEDDELER.

Witnesses:
WOLDEMAR HAUPT,
HENRY HASPER.